G. M. ALLERTON.
FORMING TIGHT SEAMS IN RUBBER CLOTH.
No. 77,859. Patented May 12, 1868.
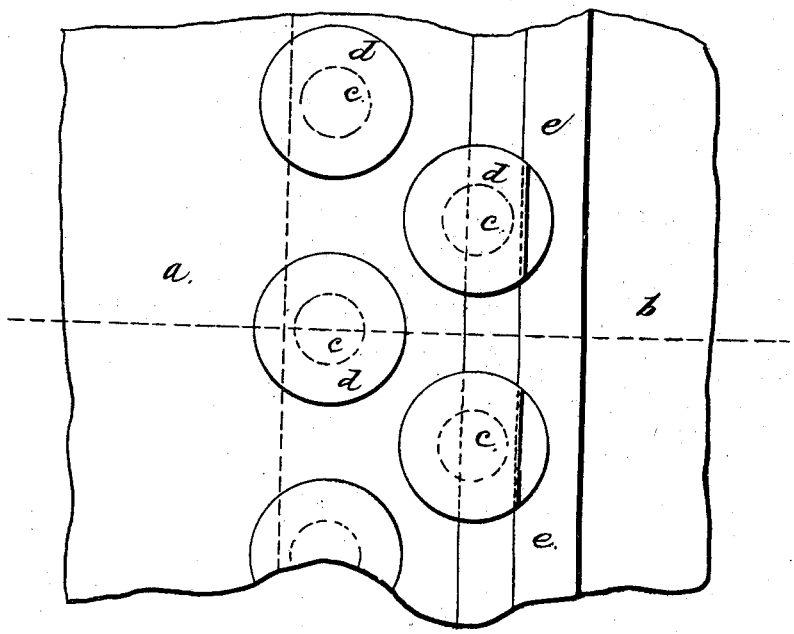
Witnesses:
Geo. D. Walker
Lemuel W. Serrell
Inventor:
Geo. M. Allerton

United States Patent Office.

GEORGE M. ALLERTON, OF NEW YORK, N. Y.

Letters Patent No. 77,859, dated May 12, 1868.

---

IMPROVEMENT IN FORMING TIGHT SEAMS IN RUBBER CLOTH.

---

The Schedule referred to in these Letters Patent and making part of the same.

---

TO ALL WHOM IT MAY CONCERN:

Be it known that I, GEORGE M. ALLERTON, of the city and State of New York, have invented and made a certain new and useful Improvement in Air and Water-Tight Seams in Rubber Cloth; and I do hereby declare the following to be a full, clear, and exact description of the said invention, reference being had to the annexed drawing, making part of this specification, wherein—

Figure 1 is a section showing the mode of uniting the edges of rubber cloth to form an air and water-tight seam, and Figure 2 is a side view of a portion of such seam.

Similar parts are referred to by like letters.

Heretofore, in uniting India-rubber cloth, it has been usual to apply cement to the contiguous surfaces, near the edges where such cloth laps to form the joint. In that case, the ends of the fibres in the woven fabric are exposed between the layers of rubber at the edges of the fabric. These absorb moisture, or allow air to pass in between the two layers of rubber, and the strain at the joint is actually taken upon the India rubber instead of the cloth.

In cases where rivets have been resorted to, as in India-rubber belting, the rivets, if applied to air-bags, buoys, floats, or life-preservers, would allow the escape of air or the leakage of water.

The nature of my said invention consists in a joint or seam for rubber cloth, formed with India-rubber stoppers over the rivets, and lapping-strips for the edges of the fabric, whereby the seam is made strong by the rivets, and those rendered air and water-tight by the stoppers, and the fibrous material covered at its edges by the lapping-strips.

In the drawing, $a$ and $b$ are the different sheets or portions of the same sheet to be united at the edges. $c\ c$ are the rivets, introduced in either one or two rows.

I prefer that the surfaces of rubber in contact at the seam be united by India-rubber cement previously to riveting.

$d\ d$ are India-rubber stoppers, cemented over the rivets, to prevent air or water passing between the rivet and the rubber cloth.

$e\ e$ are the lapping-strips, covering the edges of the fabric, and lapping upon the India-rubber surfaces of such fabrics. These are to be cemented into place.

The stoppers $d$ may be separate pieces, as shown, or formed by strips extending over several rivets.

The seams made in aforesaid manner are stronger than the body of the rubber cloth, and entirely water and air-tight.

What I claim, and desire to secure by Letters Patent, is—

The stoppers to the rivets, and the lapping-strips, applied to and combined with the joint or seam of India-rubber cloth, as and for the purposes set forth.

In witness whereof, I have hereunto set my signature, this twelfth day of February, 1868.

GEO. M. ALLERTON.

Witnesses:
 CHAS. H. SMITH,
 GEO. D. WALKER.